United States Patent
Crawford et al.

(10) Patent No.: US 10,226,738 B2
(45) Date of Patent: Mar. 12, 2019

(54) APPARATUS AND METHOD FOR GASEOUS EMISSIONS TREATMENT USING FRONT END INDUCTION HEATING

(71) Applicant: Advanced Technology Emission Solutions Inc., Toronto (CA)

(72) Inventors: Robin Crawford, Carlisle (CA); John Douglas, Brantford (CA)

(73) Assignee: ADVANCED TECHNOLOGY EMISSION SOLUTIONS INC., Toronto, Ontario (CA)

(*) Notice: Subject to any disclaimer, the term of this patent is extended or adjusted under 35 U.S.C. 154(b) by 133 days.

(21) Appl. No.: 15/279,423

(22) Filed: Sep. 28, 2016

(65) Prior Publication Data
US 2017/0014765 A1     Jan. 19, 2017

Related U.S. Application Data

(63) Continuation-in-part of application No. 14/452,800, filed on Aug. 6, 2014, now Pat. No. 9,488,085.
(Continued)

(51) Int. Cl.
*B01D 53/94*     (2006.01)
*B01J 35/04*     (2006.01)
(Continued)

(52) U.S. Cl.
CPC ..... *B01D 53/9431* (2013.01); *B01D 53/9418* (2013.01); *B01J 35/04* (2013.01); *F01N 3/2013* (2013.01); *F01N 3/2026* (2013.01); *F01N 3/2828* (2013.01); *B01D 2255/40* (2013.01); *B01D 2255/50* (2013.01); *F01N 2240/05* (2013.01); *F01N 2510/00* (2013.01); *Y02T 10/26* (2013.01)

(58) Field of Classification Search
CPC ...... F01N 3/0892; F01N 2240/28; F01N 3/01; F01N 13/02; F02B 3/06
See application file for complete search history.

(56) References Cited

U.S. PATENT DOCUMENTS 3,581,489 A * 6/1971 Camin ............... B01J 8/067
                                                422/177
3,779,710 A * 12/1973 Burstein ............ B01D 53/86
                                                219/393
(Continued)

FOREIGN PATENT DOCUMENTS

JP          08028250 A  *  1/1996
JP          08326522 A  * 12/1996
(Continued)

OTHER PUBLICATIONS

JP 08028250, Machine Translation, Translated on Jun. 20, 2018.*

*Primary Examiner* — Patrick Maines
(74) *Attorney, Agent, or Firm* — Stuart L. Wilkinson

(57) ABSTRACT

An assembly for treating gaseous emissions includes a substrate body having a front and a rear and cells for the passage of emissions gas. Inductance heating metal is located in the substrate body and an induction heating coil is mounted adjacent the substrate body for generating a varying electromagnetic field for inductively heating the metal and thereby heating the substrate body. A greater concentration of the metal is located near the front of the substrate body than near the rear.

19 Claims, 6 Drawing Sheets

Related U.S. Application Data

(60) Provisional application No. 62/322,719, filed on Apr. 14, 2016, provisional application No. 62/306,885, filed on Mar. 11, 2016, provisional application No. 62/258,071, filed on Nov. 20, 2015, provisional application No. 62/234,166, filed on Sep. 29, 2015, provisional application No. 61/910,067, filed on Nov. 28, 2013, provisional application No. 61/879,211, filed on Sep. 18, 2013.

(51) Int. Cl.
*F01N 3/20* (2006.01)
*F01N 3/28* (2006.01)

(56) References Cited

U.S. PATENT DOCUMENTS

| | | | | |
|---|---|---|---|---|
| 3,785,778 A | * | 1/1974 | Burstein | B01D 53/34 |
| | | | | 126/299 R |
| 4,007,589 A | * | 2/1977 | Neidhard | F01N 11/002 |
| | | | | 60/276 |

FOREIGN PATENT DOCUMENTS

| | | | | |
|---|---|---|---|---|
| JP | 11336534 | A | * | 12/1999 |
| JP | 2007236638 | A | * | 9/2007 |
| JP | 2009225602 | A | * | 10/2009 |
| JP | 2010024910 | A | * | 2/2010 |
| JP | 2013199394 | A | * | 10/2013 |

* cited by examiner

APPARATUS AND METHOD FOR GASEOUS EMISSIONS TREATMENT USING FRONT END INDUCTION HEATING

CROSS REFERENCE TO RELATED PATENTS

The present application claims priority pursuant to 35 U.S.C. § 119(e) from:
U.S. Provisional Application Ser. No. 62/234,166 filed Sep. 29, 2015 entitled "Catalytic converter structures with directed induction heating";
U.S. Provisional Application Ser. No. 62/258,071 filed Nov. 20, 2015 entitled "Catalytic converter system with controlled induction heating and methods for use";
U.S. Provisional Application Ser. No. 62/306,885 filed Mar. 11, 2016 entitled "Structures for inductive heating";
U.S. Provisional Application Ser. No. 62/322,719 filed Apr. 14, 2016 entitled "Induction heating structures";
The present application is a continuation in part of U.S. patent application Ser. No. 14/452,800 entitled "Catalytic converter structures with induction heating" filed Aug. 6, 2014 which claims priority pursuant to 35 U.S.C. § 119(e) from
U.S. Provisional Application Ser. No. 61/879,211 entitled "Catalytic converter employing electrohydrodynamic technology" filed Sep. 18, 2013, and
U.S. Provisional Application Ser. No. 61/910,067 entitled "Catalytic converter employing electrohydrodynamic technology" filed Nov. 28, 2013.

The disclosures of the above-numbered applications are hereby incorporated herein by reference in their entirety and made part of the present application for all purposes.

This application is one of four related applications filed on the same date and naming the inventors of this application, the related applications being:
Apparatus and method for gaseous emissions treatment with directed induction heating
Apparatus and method for gaseous emissions treatment using front end induction heating
Apparatus and method for gaseous emissions treatment with induction heating of loop conductors
Apparatus and method for gaseous emissions treatment with enhanced catalyst distribution

FIELD OF THE INVENTION

This invention relates to a structures and methods of operation of catalytic converters, particulate filters (PFs) and like structures for treating exhaust gases to reduce harmful pollution and has particular but not exclusive application to reducing pollution from internal combustion engines at start-up and when idling.

BACKGROUND

The U.S. Department of Transportation (DOT) and the U.S. Environmental Protection Agency (EPA) have established U.S. federal rules that set national greenhouse gas emission standards. Beginning with 2012 model year vehicles, automobile manufacturers required that fleet-wide greenhouse gas emissions be reduced by approximately five percent every year. Included in the requirements, for example, the new standards decreed that new passenger cars, light-duty trucks, and medium-duty passenger vehicles had to have an estimated combined average emissions level no greater than 250 grams of carbon dioxide ($CO_2$) per mile in vehicle model year 2016.

Catalytic converters and DPFs are used in internal combustion engines to reduce noxious exhaust emissions arising when fuel is burned as part of the combustion cycle. Significant among such emissions are carbon monoxide and nitric oxide. These gases are dangerous to health but can be converted to less noxious gases by oxidation respectively to carbon dioxide and nitrogen/oxygen. Other noxious gaseous emission products, including unburned hydrocarbons, can also be converted either by oxidation or reduction to less noxious forms. The conversion processes can be effected or accelerated if they are performed at high temperature and in the presence of a suitable catalyst being matched to the particular noxious emission gas that is to be processed and converted to a benign gaseous form. For example, typical catalysts for the conversion of carbon monoxide to carbon dioxide are finely divided platinum and palladium, while a typical catalyst for the conversion of nitric oxide to nitrogen and oxygen is finely divided rhodium.

Catalytic converters and PFs have low efficiency when cold, i.e. the running temperature from ambient air start-up temperature to a temperature of the order of 300 C or "light-off" temperature, being the temperature where the metal catalyst starts to accelerate the pollutant conversion processes previously described. Light-off is often characterized as the temperature at which a 50% reduction in toxic emissions occurs and for gasoline is approximately 300° C. Below light-off temperature, little to no catalytic action takes place. This is therefore the period during a vehicle's daily use during which most of the vehicle's polluting emissions are produced. Getting the catalytic converter or PF hot as quickly as possible is important to reducing cold start emissions.

Copending U.S. patent application Ser. No. 14/452,800 (Catalytic converter structures with induction heating) shows a catalytic converter assembly having a substrate body with a plurality of cells for cell therethrough of exhaust gases. Metal is located at predetermined locations in the substrate body and an electromagnetic field generator is mounted adjacent the substrate body for generating a varying electromagnetic field inductively to heat the metal and so heat the substrate body.

SUMMARY OF THE INVENTION

According to one aspect of the invention, an assembly for treating gaseous emissions comprises a substrate body having a plurality of cells for the passage of emissions gas, respective lengths of metal wire located in each of a first set of the plurality of cells, and an induction heating coil mounted adjacent the substrate body for generating a varying electromagnetic field, thereby inductively to heat the lengths of wire and thereby to heat the substrate body, wherein the wires are distributed non-uniformly through the substrate body to obtain a desired inductance heating pattern at the substrate body.

In one implementation, a relatively higher concentration of the wires per unit volume is sited towards the center of the substrate body to compensate for the fact that electromagnetic flux generated by the induction heating coil center falls off with distance from the coil. In another implementation, cells in regions radially remote from the center of the substrate body contain little or no wires so that electromagnetic flux generated at the coil is not absorbed within these regions but, instead, penetrates more deeply towards the center of the substrate body. In a further implementation, a relatively higher concentration of the metal wires is located at some intermediate position between the center and perimeter of the substrate body, whereby heat generated within the intermediate layer flows both inwardly towards the center and outwardly towards the perimeter of the substrate body.

According to another aspect of the invention, an assembly for treating gaseous emissions comprises a substrate body having a front end, a rear end, a plurality of cells for the passage of emissions gas from the front end to the rear end, metal located in the substrate body, and an induction heating coil mounted adjacent the substrate body for generating a varying electromagnetic field, thereby inductively to heat the metal and thereby to heat the substrate body, wherein a greater concentration of the metal is located near the front end of the substrate body than near the rear end of the substrate body. In one implementation, the substrate body has no inductance heating metal near the rear end and all of the inductance heating metal is located near the front end. In such an implementation, the induction heating coil can extend only over a part of the length of the substrate body corresponding to the location of the inductance heating metal. The metal can be configured as wire segments shorter than the full length of the substrate body.

According to a further aspect of the invention, an assembly for treating gaseous emissions comprises a substrate body having a plurality of cells for the passage of emissions gas, respective lengths of metal located in each of a first set of the plurality of cells, and an induction heating coil mounted adjacent the substrate body for generating a varying electromagnetic field, thereby inductively to heat the lengths of wire and thereby to heat the substrate body, wherein the metal in each of the first set of cells is configured as a loop conductor. In one implementation, the loop conductors can be a hollow wire.

According to another aspect of the invention, an assembly for treating gaseous emissions comprises a substrate body having a plurality of cells for the passage of emissions gas, respective lengths of metal wire located in each of a first set of the plurality of cells, and an induction heating coil mounted adjacent the substrate body for generating a varying electromagnetic field, thereby inductively to heat the lengths of wire and thereby to heat the substrate body, wherein the metal wires in the first set of cells are joined together to form a continuous inductance loop conductor.

According to another aspect of the invention, an assembly for treating gaseous emissions comprises a substrate body having a plurality of cells for the passage of emissions gas, respective lengths of metal wire located in each of a first set of the plurality of cells, and an induction heating coil mounted adjacent the substrate body for generating a varying electromagnetic field, thereby inductively to heat the lengths of wire and thereby to heat the substrate body, wherein the metal wires in the first set of cells has one of a hollow cross section and an open cross-sectional shape being one a generally L, C, U and V-shape cross-section. In one configuration, at least one of the wires bears against and covers a part of interior walls of the cell in which the wire is contained and leaves another part of the walls of the cell exposed to passage of exhaust gas along the cell, such exposed wall part bearing a layer of pollution treating catalyst. Preferably, a part of the wires also exposed to passage of exhaust gas along the cell also bears a layer of pollution treating catalyst.

According to another aspect of the invention, an assembly for treating gaseous emissions comprises a substrate body having a front end, a rear end, a plurality of cells for the passage of emissions gas from the front end to the rear end, respective lengths of metal wire located in each of a first set of the plurality of cells, and an induction heating coil mounted adjacent the substrate body for generating a varying electromagnetic field, thereby inductively to heat the lengths of wire and thereby to heat the substrate body, wherein ends of the wires project from a front face of the substrate body at the front end. In an exemplary implementation, the induction heating coil extends beyond said front face so that a part thereof is adjacent the projecting metal wire ends. In operation of the assembly for treating gaseous emissions directed into the cells at the front end, the projecting ends can act to break up a wave front of the directed gaseous emissions to reduce back pressure. In operation of the assembly for treating gaseous emissions directed into the cells at the front end, the projecting ends when inductively heated can act to pre-heat the gaseous emissions before entry thereof into the cells. In one implementation, an inductive spiral loop heating element is also mounted at the inlet face of the substrate body and can be connected to one or more of the projecting metal wire ends.

BRIEF DESCRIPTION OF THE DRAWING

For simplicity and clarity of illustration, elements illustrated in the accompanying figure are not drawn to common scale. For example, the dimensions of some of the elements are exaggerated relative to other elements for clarity. Advantages, features and characteristics of the present invention, as well as methods, operation and functions of related elements of structure, and the combinations of parts and economies of manufacture, will become apparent upon consideration of the following description and claims with reference to the accompanying drawings, all of which form a part of the specification, wherein like reference numerals designate corresponding parts in the various figures, and wherein:

DETAILED DESCRIPTION OF THE INVENTION INCLUDING THE PRESENTLY PREFERRED EMBODIMENTS

Figure 1:
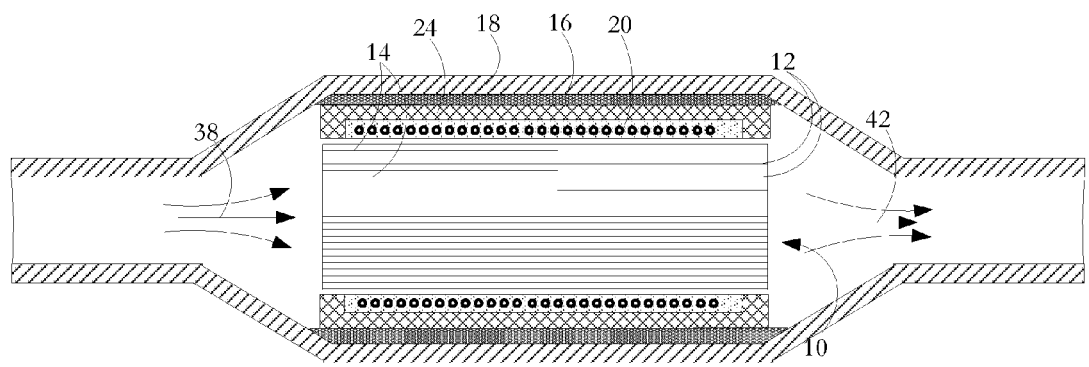
FIG. 1 is a longitudinal sectional view of a gaseous emissions treatment unit according to an embodiment of the invention.

A gaseous emissions treatment assembly may take any of a number of forms. Typical of these is a catalytic converter having a cylindrical substrate body 10 usually made of ceramic material and often called a brick, an example of which is shown in FIG. 1. The brick has a honeycomb structure in which a number of small area passages or cells 12 extend the length of the brick, the cells being separated by walls. There are typically from 400 to 900 cells per square inch (cpsi) of cross-sectional area of the substrate body 10 and the walls are typically in the range 0.003 to 0.008 inches in thickness. Typically, the ceramic substrate body 10 is formed in an extrusion process in which green ceramic material is extruded through an appropriately shaped die and units are cut successively from the extrusion, the units being then cut into bricks. The areal shape of the cells or passages 12 may be whatever is convenient for contributing to the overall strength of the substrate body 10 while presenting a large contact area at which flowing exhaust gases can interact with a hot catalyst coating the interior walls of the cells.

The interiors of the tubular cells 10 are wash-coated with a layer containing a particular catalyst material. A suitable wash-coat contains a base material, suitable for ensuring adherence to the cured ceramic material of the substrate body, and entrained particulate catalyst material for promoting specific pollution-reducing chemical reactions. Examples of such catalyst materials are platinum and palladium which are catalysts effective in converting carbon monoxide and oxygen to carbon dioxide, and rhodium which is a catalyst suitable for converting nitric oxide to nitrogen and oxygen. Other catalysts are known which promote high temperature oxidation or reduction of other gaseous materials. The wash-coating is prepared by generating a suspension of the finely divided catalyst in a ceramic paste or slurry, the ceramic slurry serving to cause the wash-coat layer to adhere to the walls of the ceramic substrate body. As an alternative to wash-coating to place catalyst materials on the substrate body surfaces, the substrate body material itself may contain a catalyst so that the brick presents catalyst material at the internal surfaces bounding the cells.

Exhaust gases from diesel (compression combustion) engines contain more nitrogen oxides than gasoline (spark combustion) engines. Long-term exposure to nitrogen oxides even at low levels can cause temporary or permanent respiratory problems. Selective catalytic reduction (SCR) is a method by which a liquid reductant is injected into a diesel engine exhaust flow to combine with nitrogen dioxide and nitric oxide (referred to collectively as $NO_x$) in the exhaust gas. A preferred reductant is aqueous urea $(2(NH_2)_2CO$ which is often referred to as diesel exhaust fluid (DEF). In the presence of a catalyst, ammonia resulting from thermal decomposition of the urea combines with the nitrogen oxides to produce less harmful products, chiefly nitrogen and water. Other reductants such as anhydrous ammonia and aqueous ammonia may also be used as an alternative to urea although especially for automotive application, on-board storage presents greater difficulty. Suitable catalysts may be any of certain metals oxides (such as those of molybdenum, vanadium, and tungsten), certain precious metals and zeolites. The typical temperature range for a SCR reaction is from 360° C. to 450° C. with a catalyst such as activated carbon being used to stimulate lower temperature reactions. As in gasoline (spark combustion engines), diesel (pressure combustion) engines may experience a period after a start-up where the exhaust temperature is too cool for effective SCR $NO_x$ reduction processes to take place. Other catalytic converters in which the present invention finds application for preheating or supplementary heating are lean NOX catalyst systems, lean NOX trap systems and non-selective catalytic reduction systems.

A gaseous emissions treatment assembly may have a series of the substrate bodies or bricks 10, each having a different catalyst layer depending on the particular noxious emission to be neutralized. Gaseous emissions treatment bricks may be made of materials other than fired ceramic, such as stainless steel. Also, they may have different forms of honeycombed cells or passages than those described above. For example, cells can be round, square, hexagonal, triangular or other convenient cross-sectional shape. In addition, if desired for optimizing strength and low thermal capacity or for other purposes, some of the extruded honeycomb walls can be formed so as to be thicker than other of the walls, or formed so that there is some variety in the shape and size of cells. Junctions between adjacent interior cell walls can be sharp angled or can present curved profiles.

Typically, as shown in FIG. 1, the wash-coated ceramic honeycomb brick 10 is wrapped in a ceramic fibrous expansion blanket 16. A stamped metal casing or can 18 transitions between the parts of an exhaust pipe (not shown) fore and aft of the gaseous emissions treatment unit so as to encompass the blanket wrapped brick. The casing 18 is typically made up of two parts which are welded to seal the brick in place.

The expansion blanket 16 provides a buffer between the casing 18 and the brick 10 to accommodate their dissimilar thermal expansion coefficients. The metal of the sheet metal casing 18 expands much more than the ceramic material of the brick at a given temperature increase and, if the two materials were bonded together or in direct contact with each other, destructive stresses would be experienced at the interface of the two materials. The blanket 16 also dampens vibrations from the exhaust system that might otherwise damage the brittle ceramic of the substrate body.

In use, the encased brick (or bricks) is mounted in the vehicle exhaust line to receive exhaust gases from the engine and to pass them to the vehicle tail pipe. The passage of exhaust gases through the gaseous emissions treatment unit heats the ceramic brick to promote catalyst activated processes where the flowing gases contact the catalyst layer. Especially when the vehicle engine is being run at optimal operating temperature and when there is substantial throughput of exhaust gases, such treatment units operate substantially to reduce the presence of noxious gaseous emissions entering the atmosphere. Such units have shortcomings however at start-up when the interior of the brick is not at high temperature and during idling which may occur frequently during city driving or when waiting for a coffee at a Tim Hortons drive-through.

Brick shape, profile and cell densities vary among different manufacturers. For example, some bricks are round and some are oval. Some assemblies have single stage bricks that are generally heavily wash-coated with the catalyst metals, while others may have two or three bricks with different wash-coatings on each brick. Some exhausts have 900, 600 and 400 cpsi cell densities used in the full exhaust assembly, while others use only 400 cpsi bricks throughout. A close-coupled converter may be mounted up close to the exhaust manifold with a view to reducing the period between start-up and light-off temperature. An underfloor converter can be located further from the engine where it will take relatively longer to heat up but be relatively larger and used to treat the majority of gases once the exhaust assembly is up to temperature. In another configuration, a unit for reducing the period to light-off temperature and a unit to deal with high gas flow after light-off are mounted together in a common casing.

At one or more locations in the assembly, sensors mounted in the exhaust gas flow including within or adjacent the substrate body provide feedback to the engine control system for emission checking and tuning purposes. Aside from start-up, control of fuel and air input has the object typically of maintaining a 14.6:1 air:fuel ratio for an optimal combination of power and cleanliness. A ratio higher than this produces a lean condition—not enough fuel. A lower ratio produces a rich condition—too much fuel. The start-up procedure on some vehicles runs rich for an initial few seconds to get heat into the engine and ultimately the catalytic converter. The structures and operating methods described below for indirectly heating the catalyst layers and the exhaust gases can be used with each of a close-coupled catalytic converter, an underfloor converter, and a combination of the two. Outputs from the temperature sensors are taken to a controller at which the monitored temperature or temperatures are used to control when induction and/or EHD heating are switched on and off. Using an appropriate algorithm implemented at the controller, the monitored temperatures may also be used to control specific effects of the applied heating processes to achieve a particular heating pattern.

The brick 10 illustrated in the gaseous emissions treatment assembly of FIG. 1 is modified to enable induction heating. Induction heating is a process in which a metal body is heated by applying a varying electromagnetic field so as to change the magnetic field to which the metal body is subject. This, in turn, induces eddy currents within the body, thereby causing resistive heating of the body. In the case of a ferromagnetic metal body, heat is also generated by a hysteresis effect. When the non-magnetized ferromagnetic metal is placed into a magnetic field, the metal becomes magnetized with the creation of magnetic domains having opposite poles. The varying field periodically initiates pole reversal in the magnetic domains, the reversals in response to high frequency induction field variation on the order of 1,000 s to 1,000,000 s cycles per second (Hz) depending on the material, mass, and shape of the ferromagnetic metal body. Magnetic domain polarity is not easily reversed and the resistance to reversal causes further heat generation in the metal.

As illustrated in FIG. 1, surrounding the ceramic substrate body is a metal coil 20 and, although not visible in FIG. 1, located within selected cells 12 are metal rods or wires 22. By generating a varying electromagnetic field at the coil 20, a chain reaction is initiated, the end result of which is that after start-up of a vehicle equipped with an exhaust system embodying the invention, light-off may be attained more quickly in the presence of the varying electromagnetic induction field than if there were no such field. The chain reaction is as follows: the varying electromagnetic field induces eddy currents in the metal elements; the eddy currents cause heating of the metal elements; heat from the metal elements is transferred to the ceramic substrate body; heat from the heated substrate body is transferred to exhaust gas as it passes through the converter; and the heated exhaust gas causes the catalytic reactions to take place more quickly compared to unheated exhaust gas. Conduction from the heated wires is the primary source of heat transfer to the ceramic substrate and therefore to the exhaust gases when the converter is in operation. There is also a small amount of convective and radiated heat transfer at any small air gaps between a wire and the interior surface of the cell within which it is contained.

The coil 20 is a wound length of copper tube, although other materials such as copper wire or litz wire may be used. Copper tube is preferred because it offers high surface area in terms of other dimensions of the coil; induction being a skin-effect phenomenon, high surface area is of advantage in generating the varying field. If litz wire or copper wire is used, an enamel or other coating on the wire is configured not to burn off during sustained high temperature operation of the converter. An air gap between the coil 20 and the nearest inductance metal wires 22 prevents significant heat transfer from the wires 22 to the coil 10 which would otherwise increase the coil resistivity and so lower its efficiency.

A layer 24 of electromagnetic field shielding material is located immediately outside the coil 20 to provide induction shielding and to reduce induction loss to the metal converter housing. The shielding layer also acts to increase inductive coupling to the substrate body 10 to focus heating. The magnetic shield 24 can be made from a ferrite or other high-permeability, low-power-loss materials such as Giron, MagnetShield, Papershield, Finemet, CobalTex, or other magnetic shielding material that can arranged to surround some or all of the windings of the coil 20. In particular, the magnetic shield 24 operates as a magnetic flux concentrator, flux intensifier, diverter, or flux controller to contain the magnetic fields within the substrate body. The magnetic shield lowers loss by mitigating undesirable heating of adjacent conductive materials. Without the magnetic shield, magnetic flux produced by the coil 20 could spread around the coil and link with the electrically conductive surroundings such as the metal casing 18 and other surrounding metal in an exhaust system, and/or other components of an internal combustion engine, vehicle, generator or other electrical system or host system, decreasing the life of these components and increasing energy loss. In addition, the magnetic shield 24 operates to direct the magnetic field to the substrate body 10 providing selective or enhanced heating of a desired region of the substrate body, for example, by redirecting magnetic flux that would otherwise travel away from that desired region. In particular, the magnetic shield can operate to concentrate the magnetic flux produced by the coil 20 in the direction of the metal wires or rods 22 in the substrate body 10 for more efficient heating. As an additional benefit, the magnetic shield can improve the electrical efficiency of the induction coil 20 by increasing power transfer.

The coil is contained in a fiber insulation sheath with the sheathed coil being encased in a in cast, cured insulation. The cast insulation functions both to stabilize the coil position and to create an air-tight seal to confine passage of the exhaust gases through the ceramic honeycomb substrate body 10 where catalytic action takes place. The insulation also provides a barrier to prevent the induction coil 20 from shorting on the converter can 18 or the ferrite shield 24. The insulation is suitable alumino-silicate mastic. In an alternative embodiment, the substrate body is wrapped in an alumino-silicate fiber paper. In one manufacturing method, the copper coil 20 is wrapped around the substrate body and then placed in the casing or can 18. In an alternative manufacturing method, the coil 20 is placed in the can 18 and the substrate body 10 is inserted into the coil/can assembly.

In one embodiment of the invention, a varying electromagnetic induction field is generated at the coil by applying power from either a DC or AC source. Conventional automobiles have 12 VDC electrical systems. The induction system can operate on either DC or AC power supply. The induction signal produced can also be either DC or AC driven. For either DC or AC, this produces a frequency of 1 to 200 kHz, a RMS voltage of 130 to 200V and amperage of 5 to 8 A using 1 kw of power as an example. In one example suitable for road vehicles, a DC to DC bus converts the vehicle's 12 VDC battery power to the required DC voltage outlined above. In another example suitable for conventional road vehicles, a DC to AC inverter converts the vehicle's 12V DC battery power to the desired AC voltage outlined above. Another example is more suited to hybrid vehicles having both internal combustion engines and electric motors have on-board batteries rated in the order of 360V voltage and 50 kW power. In this case, the battery supply power is higher, but the same basic DC to DC bus or DC to AC inverter electrical configuration can be applied. An insulated gate bipolar transistor (IGBT) or metal-oxide-semiconductor field effect transistor (MOSFET) high speed switch is used to change the direction of electrical flow through the coil. In terms of the effect of a varying electromagnetic induction field on metal in the ceramic substrate body, a low switching frequency produces a longer waveform providing good field penetration below the surface of the metal element and therefore relatively uniform heating. However, this is at the sacrifice of high temperature and rapid heating owing to the lack of switching. In contrast, a high switching frequency produces a shorter waveform, which generates higher surface temperature at the sacrifice of penetration depth. Applied power is limited to avoid the risk of melting the metal elements. A suitable power input to a single brick coil is of the order of 1.1 kw.

Figure 3:
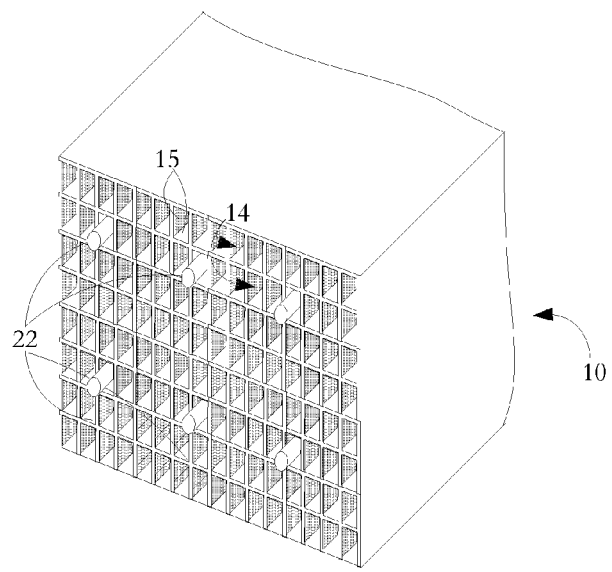
FIG. 3 is a perspective sectional view of a part of a gaseous emissions treatment unit according to an embodiment of the invention showing wires located in cells of a substrate body.

As previously described, metal wires or rods 22 are located at selected locations of the ceramic substrate body 10 as shown in the detail view of FIG. 3. The wires 22 are fixed in place by a friction fit which is at least partially achieved by closely matching the wire exterior area dimensions to the cell area dimensions so that surface roughness of the wire surface and the cell walls 14 locks the wires 22 in place. Wires can be formed with a non-linear element such as a bow or crimp so that the bow or crimp is straightened somewhat as the wire is inserted into a cell and so is held by the cell walls as the wire tends to return to its original bow or crimped shape causing at least a part of the wire to bear against a part of the cell walls 14 and so enhance the friction fit to retain the wire in place. The overall friction fit can be such as to resist gravity, vibration, temperature cycling, and pressure on the wires as exhaust gases pass through the substrate body. Wires may alternatively, or in addition, be fixed into the cells by bonding outer surfaces of the wires to interior surfaces of respective cells. A suitable composite adhesive may be a blend of materials chosen to reduce temperature cycling stress effects in which there may be significant metal wire expansion/contraction, but vanishingly small expansion/contraction of the ceramic substrate. This differential can produce stresses at the adhesive interface between the two materials. By using such a composite adhesive, movement of a bonded wire relative to the surrounding cell walls may be reduced while maintaining high heat transfer.

Figure 2:
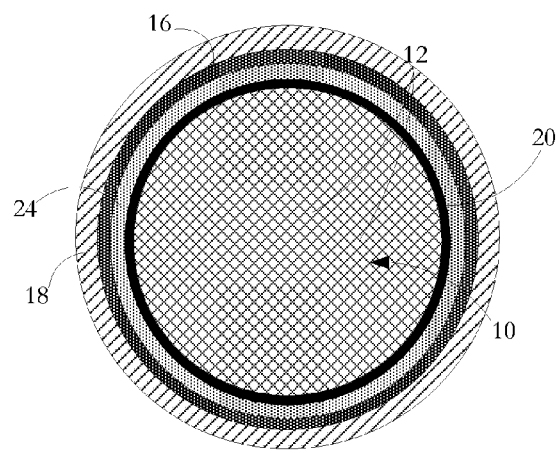
FIG. 2 is a cross-sectional view of the gaseous emissions treatment unit of FIG. 1.

Field produced by the electromagnetic induction coil (FIGS. 1 and 2) can be tuned to the metal wire load to achieve high efficiency in terms of generating heat and speed to light-off. Heating effects can be modified by appropriate selection of any or all of (a) the electrical input waveform to the coil, (b) nature and position of passive flux control elements, and (c) nature, position, and configuration of the coil. In particular, as will presently be described, the heating pattern can be determined by appropriate location and configuration of the metal wires. In addition, the applied field can be changed with time so that there is interdependence between the induction field/heating pattern and the particular operational phase from pre-start-up to highway driving. In an alternative configuration, more than one coil can be used to obtain desired induction effects. For example, a substrate body having an annular cross-section can have one energizing coil at the substrate perimeter and a second energizing coil at the substrate core (not shown).

A suitable metal for the inserted wire is a ferromagnetic metal such as stainless steel grade 430 which has high magnetic permeability and corrosion resistance. Lower permeability alloys such as 300 or 400 series stainless steels may also be used. Alternative metals can be used depending on particular properties required in making the wire inserts and in fixing inserts within selected cells of the ceramic substrate. Such properties include metal formability, ductility, softness and elasticity. For shaping the direction and strength of magnetic flux in the substrate, lower magnetic permeability metals or alloys may be used for metal inserts in the outer cells with relatively higher magnetic permeability metals being used for metal inserts in the inner cells. Metals having very high magnetic permeability may also be used. For example, Kanthal iron-chrome-aluminum alloys used in wires manufactured by Sandvik have a relative permeability of 9000 and greater. High relative permeability can be achieved using wires made of other alloys including nickel-iron and iron-cobalt alloys.

Figures 4, 5:
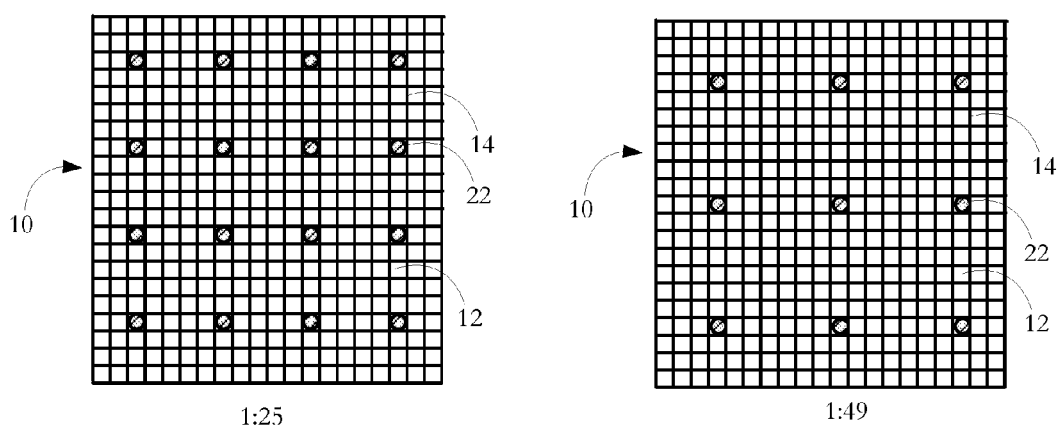
FIG. 4 is a representation of an end view of the unit part of FIG. 3 showing wires located in a first array pattern and density.
FIG. 5 is a representation of an end view of the unit part of FIG. 3 showing wires located in a second array pattern and density.

In the embodiments of FIGS. 4 and 5 which show in each case a small part of a substrate body 10, the wires 22 are arranged in a regular array as viewed from one end of the substrate body or in cross-section across it. In FIG. 4, there is a metal wire at every $5^{th}$ cell viewed vertically and horizontally (1:25). In FIG. 5, there is a metal wire at every $7^{th}$ cell viewed vertically and horizontally (1:49). Other operating parameters being equal, the 1:49 array has higher flux density than the 1:25 array as there are fewer wires. Flux density is generally more evenly distributed in the 1:25 array than the 1:49 array. Other operating parameter being equal, the 1:49 array produces more heat than the 1:25 array. A 1:25 array in a 400 cells per square inch (cpsi) substrate has a satisfactory heating performance and not too great an occlusion of converter cells from the viewpoint of pollution-cleaning catalytic reactions implemented when operated as a catalytic converter or PF. A significantly higher ratio of wires to cells can result in slower heating to light-off because of the high overall thermal capacity represented, in total, by the wires and because of the fact that some wires block the "line of sight" field effect on other wires. In contrast, while a significantly lower ratio of wires to cells results in fewer occlusions of converter cells, a sparse distribution of metal results in reduced heat generation and increased time to light-off.

A uniform wire array such as those shown in FIGS. 4 and 5 will not normally produce uniform heating or a uniform temperature through the substrate body although it may provide rapid heating and a generally uniform temperature profile for smaller substrate bodies, typically 4 inches in diameter or less, because, in that case, all wires are relatively close to the coil. Such a small substrate body may be used for small displacement gasoline engines. For substrate bodies larger than 4 inches in diameter, induction heating from a uniform wire array pattern has lower electrical and thermal efficiency. Because magnetic flux from the coil is strongest closest to the coil and weakens further away from the coil, a metal wire closer to the source of the induction field becomes hotter and becomes hot more quickly than an equivalent metal wire located further away from the source. In such substrate bodies, the magnetic flux is not as uniform as in the smaller substrate bodies. Center and outer located wires do not experience similar levels of magnetic flux as the magnetic flux drops off drastically with distance from the coil.

As shown in FIG. 3, the interior walls 14 of the cells 12 are coated with a catalyst 15 if the assembly is to function as a catalytic converter but may be uncoated or coated if the assembly is to function as a particulate filter.

In alternative embodiments as shown in FIGS. 6 to 10, the distribution of metal wires 22 is shown, but not the substrate body itself or other elements of the gaseous emissions treatment assembly such as any catalyst coating, coil and casing.

Figure 6:
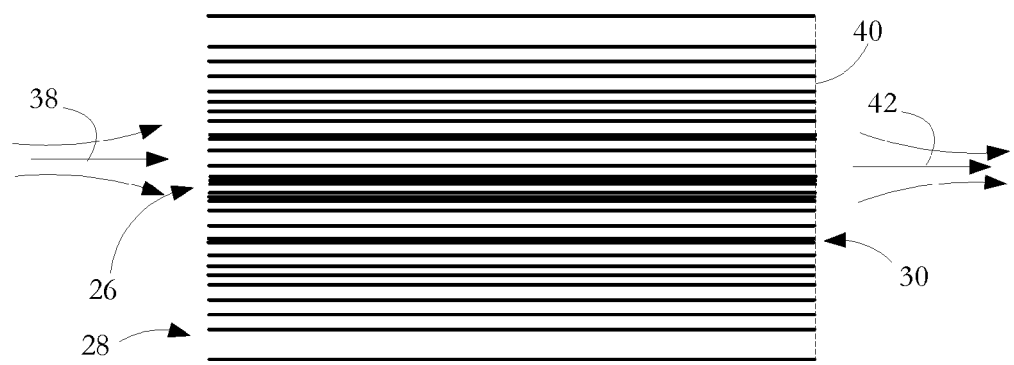
FIG. 6 is a longitudinal sectional representation of a gaseous emissions treatment unit according to an embodiment of the invention showing wires located in a third array pattern and density.

As shown in FIG. 6, a relatively higher concentration of metal wires 22 (wires per unit volume) is sited towards the center of the substrate body to compensate for the fact that the field effect from the coil source will be considerably less near the center 26 of the substrate body than near the outer part 28. The FIG. 6 embodiment has closely spaced wires near the center 26 and also at an intermediate position 30. More or less complex wire placement configurations can be adopted depending on the temperature profile and heat flow patterns desired. The absence of wires at outer region 28 of the substrate body 10 limits the number of preferred inductance paths at the outer regions. This forces magnetic flux to find the next best preferred inductance path which, in the absence or scarcity of wires in the outer region 28, will be a wire or wires closer to the center 26 of the substrate body. Flux, and therefore heat, are consequently guided towards the center of the substrate body. This results in the center section 26 being adequately heated and, just as importantly, the outer regions 28 not being overheated. The densest array of wires 22 is found at the center 26 of the substrate body 10 and the lowest density is found in the outer region 28. There may be a progressive change in the array pattern density or a stepped change with defined array densities in specific regions such as the center, middle and outside.

In the previously described embodiments, the distribution of inductance metal elements 22 relative to the positions of the cells 12 is configured so that the heating effect is generally uniform across the area of the substrate body 10. Especially for start-up and idling, where non-uniform exhaust gas flow patterns may develop, there may be advantage in developing a heat pattern across the substrate body which is not uniform. As previously noted, this may be achieved by appropriately siting inductance metal wires or rods 22 in selected cells 12. It may also be achieved in another embodiment of the invention by using differently sized, shaped or composition metal wires.

In the embodiments illustrated in FIGS. 7 to 10, wire segments 32 extend along part only of the lengths of selected cells 14, the lengths and positions of the wire segments 32 being selected to shape the flux density pattern and heating effect.

Figure 7:
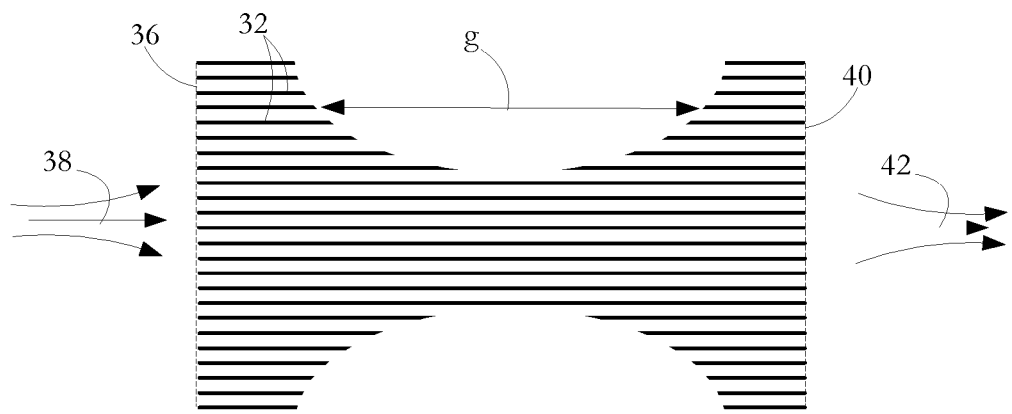
FIG. 7 is a longitudinal sectional representation showing location of wire segments for a gaseous emissions treatment unit according to another embodiment of the invention.

In the FIG. 7 embodiment, there are two wire segments 32 in each of the selected cells towards the outside 28 of the substrate body but single long wires 22 in selected cells near the core 26 of the substrate body. As in the case of full length wires, the closest wire segment 32 marks the preferred inductance path for magnetic flux. Flux traveling along a wire segment 32 will therefore tend to jump across a short air gap to the next closest neighboring wire segment 32 rather than travel through a long air gap. To encourage movement of the magnetic flux towards the center 26 of the substrate body 10, as shown in FIG. 7, a gap 'g' between wire segments 32 occupying the same cell 12 in the outer region 28 is made greater than the gap between wire segments occupying the cell 12 next closer to the center of the substrate body. The outside wire segments are made the shortest because they are closest to the induction coil and therefore experience the highest magnetic flux. The segments lengthen towards the center 26 of the substrate body to the point where full length wires are used in the center region 26 of the substrate body 10. This spreads the magnetic flux and therefore the heating effect much more effectively throughout the substrate body.

Figure 8:
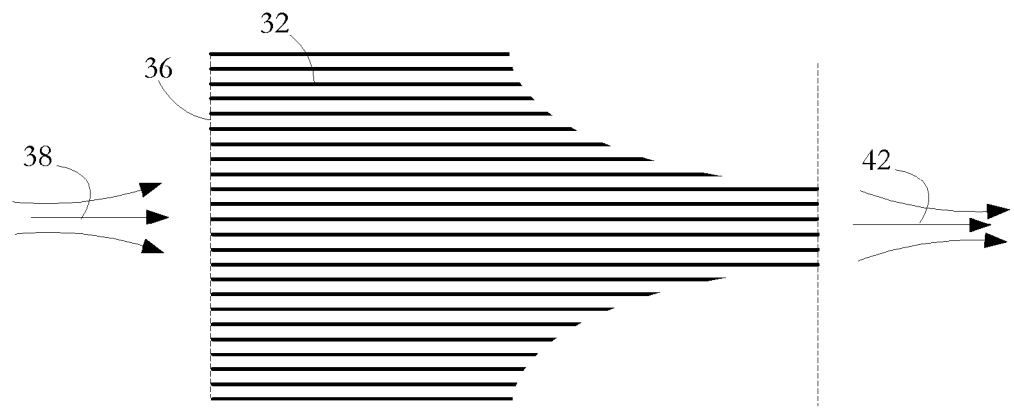
FIG. 8 is a longitudinal sectional representation showing location of wire segments for a gaseous emissions treatment unit according to a further embodiment of the invention.

In the FIG. 8 embodiment, each selected cell contains only one wire segment 32 or a full length wire for centrally located cells. However, similarly to the FIG. 7 embodiment, wire segments 32 in selected cells near the outside 28 of the substrate body 10 are shorter than wire segments 32 in selected cells near the core 26 of the substrate body. In this case, the high concentration of wire is at the front end 36 of the substrate body 10; i.e. the end at which, in operation, emissions gases 38 enter the gaseous emissions treatment assembly, as compared with the metal wire concentration located at or near the rear end 40 of the substrate body where treated emissions gases 42 exit the assembly.

Figure 11:
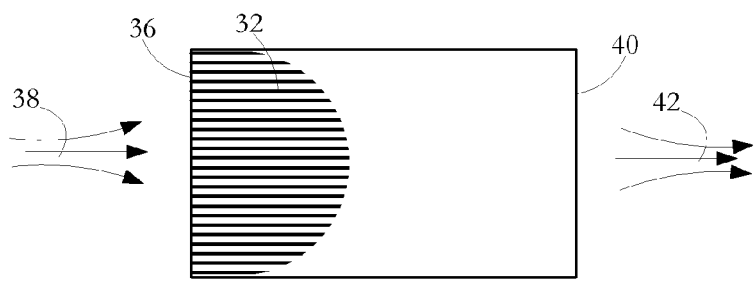
FIG. 11 is a longitudinal sectional representation showing location and density of wire segments for a gaseous emissions treatment unit according to another embodiment of the invention.
Figure 12:
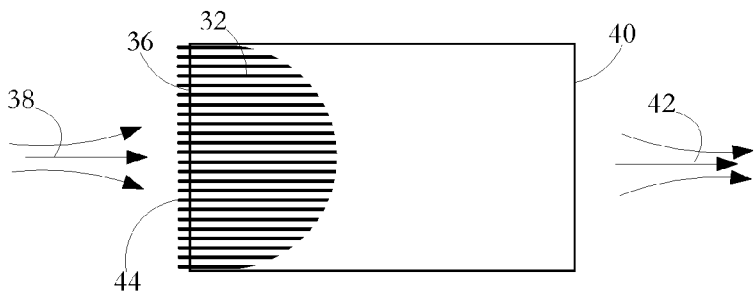
FIG. 12 is a longitudinal sectional representation showing location and density of wire segments for a gaseous emissions treatment unit according to another embodiment of the invention.

In a particular variation as shown in FIGS. 11 and 12, the wires or rods 22 are concentrated at the front end but with no wires and no part of the coil 20 located beyond a certain downstream position. With such a design, generation of electromagnetic flux and heating is focused at the front end of the brick. For a given power input, this enables a small part of the brick substrate to be heated quickly to a desired light off temperature instead of having the full brick heated more slowly, the heated part being that part first encountered by exhaust gases 38 entering the system. Front end induction heating of the substrate body 10 can produce a cascade effect if the heated front end acts to ignite unburned hydrocarbons in the exhaust gas entering the assembly during operation before light off is reached or during idling. The burning hydrocarbons as they pass down the substrate body 10 hasten the rate at which the downstream part of the substrate body and the catalyst layer reach the light off temperature whether or not that downstream part is being is being directly inductively heated.

Figure 9:
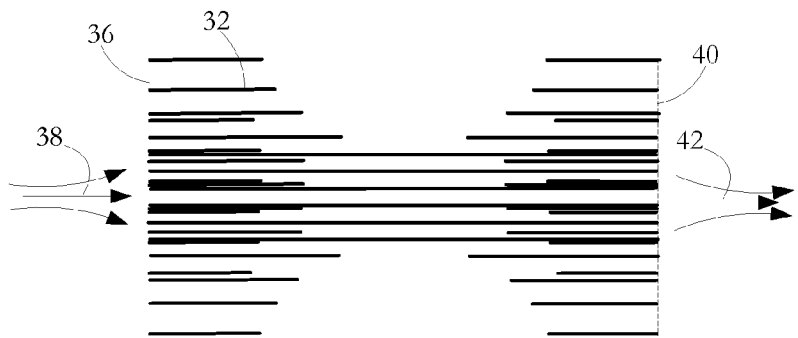
FIG. 9 is a longitudinal sectional representation showing location and density of wire segments for a gaseous emissions treatment unit according to a further embodiment of the invention.
Figure 10:
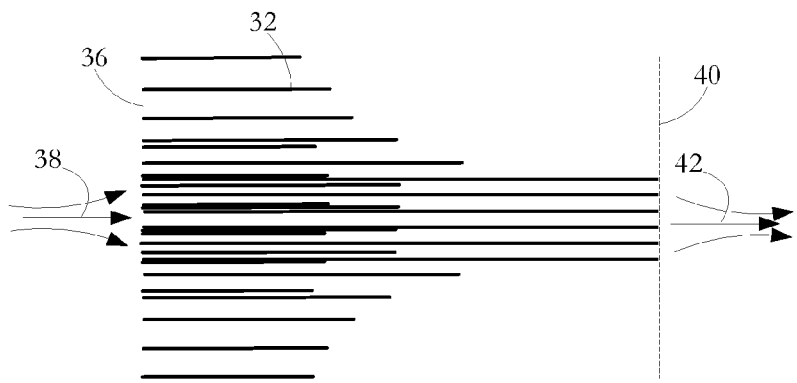
FIG. 10 is a longitudinal sectional representation showing location and density of wire segments for a gaseous emissions treatment unit according to yet another embodiment of the invention.

For improved thermal performance, the FIGS. 4, 5 and 6 (wire concentration positioning) and the FIGS. 7 and 8 (wire segment position) design methods for shaping magnetic flux density through the substrate body can be combined as illustrated in FIGS. 9 and 10. There can be an added benefit through using the greater wire-to-wire spacing of the variable array pattern in conjunction with wire segments 32 extending only part way along the lengths of the cells in which they are contained. Thus, appropriately configured, more magnetic flux can be moved to the center of the substrate body to produce a variety of heating effects. Uniform heating is possible by using variable wire segment lengths distributed symmetrically front to back in the substrate body. More intense heating on one face of the substrate body can be achieved by distributing the wire segments asymmetrically front to back. The region with the highest concentration of wire segments will experience more heating. Intense heating in the center is possible by removing more outside wires and shortening the wire segments which allows more magnetic flux to reach the center and therefore produce more heat. Intense heating in the dead center and very little on the faces and outer regions is possible by shortening the wire segment lengths in the center and reducing the number of wires in the outer region.

Catalytic reactions that take place at and above the light-off temperature are exothermic. Heat energy produced acts to raise the temperature of the substrate body above that which would be achieved by the exhaust gas alone. The exothermic reaction is self-fuelling in that, above light-off and with an adequate flow-through of exhaust gas, the exothermic reactions produce an increase of catalyst temperature by up to 100° C. As a corollary, if the flow-through of hot exhaust gas falls below that which is necessary to maintain the catalyst at the light-off temperature, the exothermic reactions cease.

FIG. 1 shows the substrate body being heating relatively uniformly along its length. In another embodiment of the invention, variations of which are depicted in FIGS. 11 to 15, induction heating is applied only to a front end part of the substrate body which, in some circumstances, can offer an advantage compared to uniform heating along the length of the substrate body. In explanation, firstly, if inductive heating is applied before or immediately after engine start, some of that heat will be lost from the catalyst regions both through conduction and radiation away from the heated zones and from convection owing to the still-cold exhaust flowing through the cells. The exhaust gas flow may push heat out of the back of the substrate body before light-off is achieved so that heat is lost from the system. Secondly, if a particular induction power is concentrated over only a small volume of the substrate body length instead of its full length, a higher flux density and a greater heating effect is produced over that smaller volume and the focused heating starts the previously described exothermic reactions earlier than if that power were applied over the full substrate body length. Thirdly, heating the whole substrate body requires a greater mass of metal heating elements, a longer induction coil, and greater mass of magnetic flux concentrator compared with materials needed for small volume heating and this adds cost and complexity.

Referring in detail to FIG. 11, a wire pattern is used that heats only the front one third of the substrate body. One suitable wire array profile is the illustrated asymmetric D-shaped profile although other symmetric or asymmetric array profiles may function equally well. The D-shaped profile array contains wire segments 32 having a range of lengths with the longest wires in the middle and the shortest at the outer edges. This profile distributes the magnetic flux well. Typically, the longer wires in the center can be almost half the length of the substrate body with the outer wires being about one-third of the length of the center wires. The average volume that the D-shaped profile occupies is about one-third of the length of the substrate body or equivalent to about one-third the volume.

In the embodiment of FIG. 12, a symmetric D-form or other suitable wire array profile has wires 44 protruding from the front 36 of the substrate body. In operation, the heated protruding wire ends 44 heat exhaust gas 38 directly as it flows into the respective cells. Because there is no part of the substrate body surrounding the wire protrusions 44, the heat goes straight to the exhaust gas 38 and not indirectly via the substrate body 10. This slightly improves the efficiency and time to light-off. The protrusion distance is limited to that required in order for the wire to be stable and not easily deform under heat and vibration. The coil and magnetic flux concentrator (not shown) are translated forward to match the positions of the protrusions 44.

Figure 13:
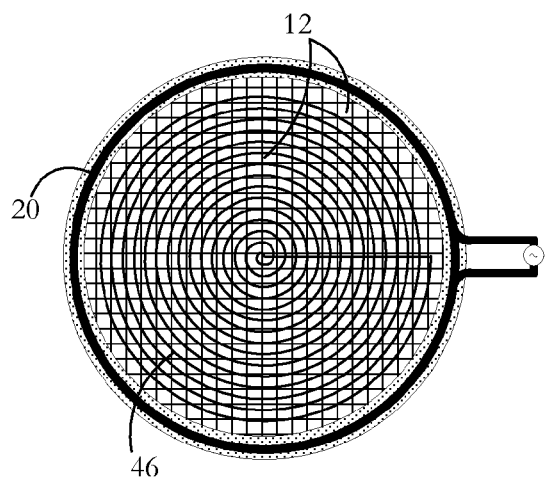
FIG. 13 is an end view of a gaseous emissions treatment unit according to an embodiment of the invention.
Figure 14:
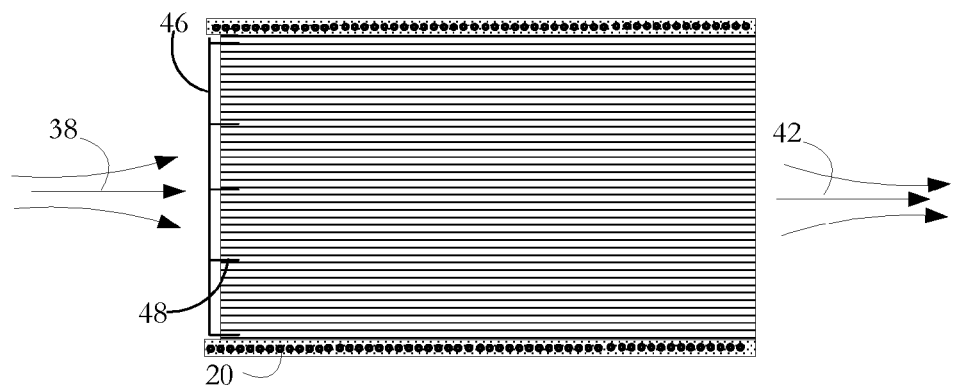
FIG. 14 is a longitudinal sectional representation of the gaseous emissions treatment unit of FIG. 13.

In the embodiment of FIGS. 13 and 14, a spiral loop inductive heating element 46 is positioned near the inlet face 36 of the substrate body 10 and acts in use to preheat exhaust gas 38 before it enters the cells of the brick. Ends of the heater element located respectively at the center and outer extremity of the spiral are connected together by a link section to close the loop. Here, the majority of inductively generated heat in the spiral heater is transferred directly to the exhaust gas. Wire protrusions or spurs 48 from the upstream heater element 46 are lodged into the ends of corresponding cells 22 of the substrate body 10 to lock the heater element 46 onto the front face 36 of the substrate body. The element 46 is positioned at least one wire diameter or about 1 to 5 mm away from the front face 36 of to avoid blocking the entrances to cells 12 beyond that needed to support the heating element. Certain cells of the substrate body may contain heating wires to complement and/or focus heating by the spiral loop heating element.

Figure 15:
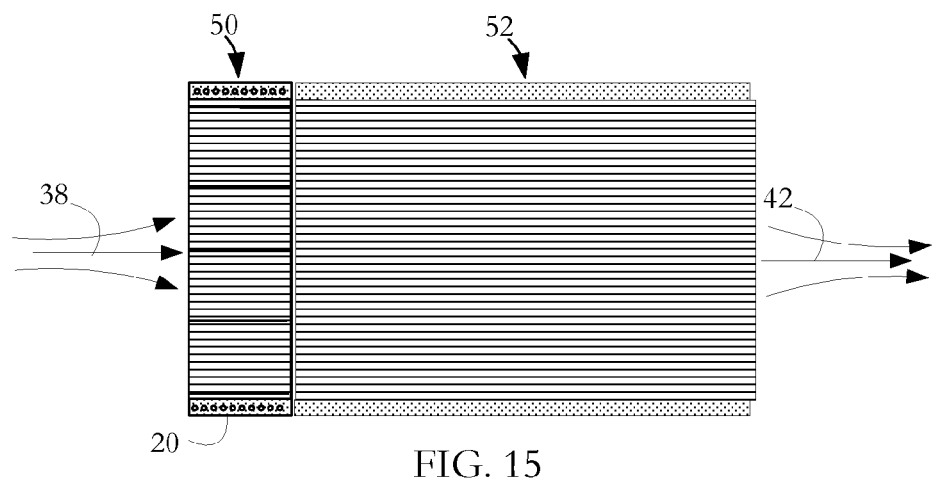
FIG. 15 is a longitudinal sectional representation showing a two-part gaseous emissions treatment unit according to another embodiment of the invention.

In the embodiment of FIG. 15, an inductively heated catalyst unit 50 is positioned immediately upstream and physically separated from a main catalyst unit 52. Decoupling an inductively heated front end unit 50 from a rear catalyst unit 52 obviates stresses and strains caused by rapid expansions and contractions of the substrate body material compared to an arrangement where the two zones are present in the same substrate body. Decoupling allows the two substrates to act independently so that one can expand or contract rapidly without impacting the other.

In each of the embodiments of FIGS. 11 to 15, the length and shape of the wires 22 and segments 32 in the front-end located wire array can be tuned for the desired heating level and distribution. In addition, for all embodiments described in this specification, heat transfer characteristics of the material of the substrate body 10 also influence the heating effect and therefore must be considered when selecting the locations of the wires or wire segments. For example, cordierite and silicon carbide are suitable materials for the substrate body, with cordierite having a relatively low heat transfer coefficient and silicon carbide having a relatively high heat transfer coefficient. As a result, silicon carbide can be provisioned with fewer heating wires than cordierite for the same heating effect.

As an alternative to shaping the magnetic field and heating effect using wire segments 32 and air gaps 'g', the gaseous emissions treatment unit can alternatively be implemented using metal wires where one wire or rod may have inductance properties different from another wire. In one such implementation, the magnetic permeability of wires positioned near the outside of the substrate body is lower than the magnetic permeability of wires positioned near the inside of the substrate body so as to distribute the magnetic flux as desired. In one example, wires near the center of the substrate body are made of 430 stainless steel and wires near the outside of the substrate body are made of 409 stainless steel.

Figure 16:
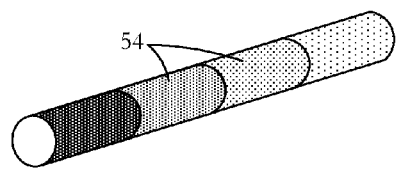
FIG. 16 is a perspective view of a length of wire for a gaseous emissions treatment unit according to an embodiment of the invention, the wire having incremental changes in properties along the length thereof.

In another implementation, as illustrated in FIG. 16, the permeability of a wire 22 varies along its length, the variation, for example, being in stepped discrete increments 54. By appropriately adjusting the permeability of a wire along its length, it can be made to have the same effect as wire segments separated by an air gap where there is no permeability difference between the metal of the two segments. Generally, for inductive heating of the substrate body containing such wires, higher permeability materials are placed in areas where greater heating is required and lower permeability materials where less heating is required. Establishing a variation in magnetic permeability along a wire is effected by differential heat treatment (annealing and quenching) at different regions of the wire. These processes change the microstructure which in turn sets the related magnetic permeability. Alternatively, or in addition, wires are permanently magnetized by subjecting them to a magnetic field with, for example, one part of a wire being magnetized more than another part. In operation, magnetic hysteresis differences between the separate parts of the wire influence the flux and heating pattern/effect. The resistivity of a metal wire also affects the way in which it is heated in the presence of a varying magnetic flux and therefore to obtain a desired differential response to the flux, the magnetic permeability and resistivity of the different wire regions must be considered together.

Whether a wire extends the full length of a cell or only partially along its length, the particular occupied cell is rendered compromised or unusable in terms of promoting a catalytic reaction to remove noxious components of exhaust gas passing through the catalytic converter or PF. This adverse effect can, in an alternative embodiment, however, be mitigated to some effect by using non-solid wires.

Figure 17:
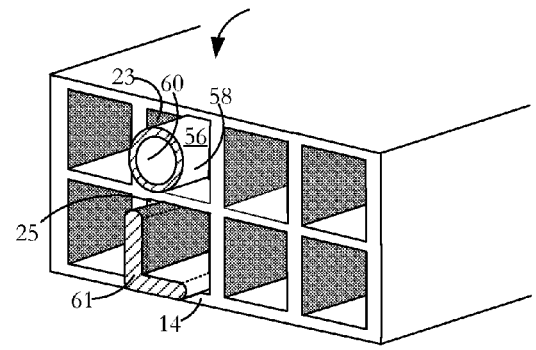
FIG. 17 is a perspective sectional view of a part of a substrate body for a gaseous emissions treatment unit according to an embodiment of the invention showing exemplary different forms of wire located in cells of the substrate body.

A hollow wire 56 such as that shown in upper cell 23 illustrated in FIG. 17, presents a closed loop circuit parallel to the loops of the induction coil. Generation of eddy currents in wire conductors is a surface effect so that a majority of current flow is at the surface of a wire 22 compared with current flow in the core of the wire. However, because current is not confined at the surface of a solid conductor, the surface eddy currents tend to dissipate somewhat as current flows from the surface towards and through the core of the wire. By using hollow wires 56, the surface area at which eddy currents are generated is effectively doubled because the hollow wire has both an outside surface 58 and an inside surface 60. In addition, by confining current flow to a closed loop, current is prevented from flowing to the axis of the wire 56 so that for the duration of time that a particular eddy current exists, its current flow is retained near the surface of the wire where it can have the greatest heating effect. The combined effect is greater surface current flow and increased heating at the wire conductor surfaces. An advantage of the hollow wire 56 in comparison with a solid wire is that the former does not completely block or occlude the catalytic converter or PF cell in which it is contained and so allows exhaust gas to pass through the cell while still functioning as a heating element. Consequently, other design parameters being equal, system back pressure is reduced compared with the use of solid wires. Reducing back pressure is important because back pressure reduces engine performance. In one example, a hollow wire that is 50% open has an inside diameter that is 70.7% of the outside diameter. This translates to 50% less back pressure for the same number of solid wires. For 75% open, four times as many hollow wires can be used compared with solid wires for the same back pressure. Non-circular hollow profiles such as square, triangular and hexagonal can also be used. Both the interior and the exterior of the hollow wire 56 can be coated with a catalyst for promoting or accelerating gaseous emissions treatment reactions with the catalyst being applied to the wire either before insertion into the respective cell 12 or being applied to the substrate body and wires after the wires have been inserted into their respective cells. In some instances catalyst metals may be alloyed with the metal of the wire to present catalyst at the wire surface. Alternatively, catalyst metallic layers are deposited by chemical vapor deposition or like process.

In a further variation, as shown in the lower cell 25 illustrated in FIG. 17, an L-section wire 61 positioned in the square cell 25 is used to heat two side walls 14 of the cell, with the other parts of the cell, including the other two walls, being open to present a significant area of catalyst to exhaust gas flowing along the cell. With a change from solid wire cross-section to non-solid wire cross-section (including actual hollow, L, C, U, V and like open form shapes), the induction field absorption characteristics also change. With a thinner cross-section compared with a solid wire, a higher induction coil switching frequency is used so as to shorten the penetration depth into the wire, to thereby match the reduced thickness and, in turn, to increase thermal conversion efficiency.

For a catalytic converter, exhaust gas passing down the center of a hollow wire conductor does not impinge on catalyst because it is separated from the coated substrate cell walls by the hollow wire conductor walls. Consequently, absent coating of the hollow conductors, untreated exhaust gas would pass down the interior of the hollow conductors without emissions treatment. To counter this, either the ceramic substrate body is coated with catalyst after the hollow wires are inserted or the hollow wires are coated with catalyst and then inserted into the coated ceramic substrate. For a conducting hollow wire segment that is relatively short, once exhaust gas has passed along the segment and enters an unoccupied length of the cell, the exhaust gas is subject to the effect of the exposed catalyst layer to stimulate high temperature emissions treatment. By using hollow wires segments of appropriate length and position, the amount of blocked cells can be reduced from 3% for a 1:25 solid wire design down to 0% with an almost negligible increase in back pressure for a 1:25 hollow wire design. One potential issue with a hollow wire is ensuring enough mass for effective heat transfer. Optimum wall thickness for a hollow wire is based on the penetration depth of the induction field. The hollow wire wall should not be so thin that it is essentially transparent to the magnetic flux in terms of developing eddy currents and associated heating, However, it should not be so thick that a significant amount of eddy current generated at the wall surfaces is quickly lost to the interior.

Figure 18:
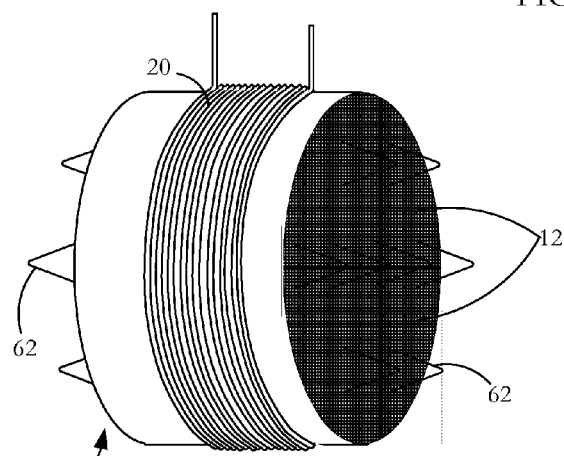
FIG. 18 is a perspective end view of a fragment of substrate body for gaseous emissions treatment unit according to an embodiment of the invention, the substrate body having a threaded closed loop conductor for induction heating the substrate body.

In another loop configuration as shown in FIG. 18, a single wire 62 is threaded backwards and forwards through selected cells 22 in the substrate body, the ends of the wire being joined together to close the loop. In effect, adjacent wire inserts in the selected channels are stitched into place. The closed loop configuration ensures substantially the same level of current anywhere in the loop at a given time regardless of positional variation in magnetic flux because current flow in the closed loop tends to normalize any current gradients that mimic flux gradients. In turn, the consistent current effectively translates to consistent wire temperature.

As previously mentioned, the induction heating configurations previously described and illustrated can be used with both catalytic converters and particulate filters (PFs). A PF is a device used in motor vehicles and other applications for removing particulate matter from the exhaust gas of an engine. The particulate matter includes ash, soot and other particulate material resulting from incomplete combustion of the engine fuel/air mix. Unlike a catalytic converter which is a flow-through device, a PF captures exhaust gas particles by forcing the exhaust gas through a filter medium. PFs have been widely commercially adopted for diesel (compression combustion) engines. Several types of PF have been used including cordierite wall flow filters, silicon carbide wall flow filters, ceramic fiber filters and metal fiber flow-through filters. PFs are also being increasingly commercially adopted for gasoline (spark combustion) engines. PFs may have a catalyst component to reduce emissions of noxious components or may be standalone with a PF unit extracting particulate matter and one or more catalytic converters located at other locations along the exhaust gas route converting harmful emissions substances to less harmful materials.

One form of PF has a ceramic substrate of honeycomb form having a large number of cells or passages extending from an input end to an output end of the filter. Alternate cells are blocked on the entrance face of the filter with fired plugs of ceramic of the same base material as the extruded substrate. Intermediate cells are blocked at the exit face of the filter so that a chequered pattern is present at each end of the substrate. In use, exhaust gas from the engine enters the cells that are open at the PF input end. The exhaust gas is forced through cell walls into the adjacent cells that are open at the PF output end. However, particles of ash or soot are retained on the cell walls, with only very small particles occasionally passing through the walls.

Over time, soot and ash particles from the exhaust gas flow through the PF tend to build up and start to block the pores of the filter medium. To prevent the PF from becoming inefficient or inoperative, the accumulated particles are periodically burned off. In one method, this is done using a regeneration cycle in which introduced regeneration fuel is burned to heat the filter to a temperature at which the soot combusts, the PF reaching a temperature somewhat higher than that reached during normal engine operation. Typically, a particulate filter regenerates at a temperature between 500 to 700 degrees C. depending on particular system factors.

Only under very high RPM and loads would a conventional automobile engine attain a temperature of that order. Consequently, in a PF regeneration operation, fuel is injected to raise the exhaust temperature. The temperature of a PF during a fuel burn regeneration cycle may be reduced somewhat by using a catalyst combined with the introduced regeneration fuel. A diesel engine (compression combustion) fuel air mix has a high oxygen content compared with a gasoline (spark combustion) engine fuel air mix and the high diesel fuel oxygen content can facilitate the fuel burn cycle. Timing and other control aspects of the regeneration cycle are controlled by the on-board computer used to control engine function, the computer working in conjunction with multiple sensors and control inputs associated with the PF.

Figure 19:
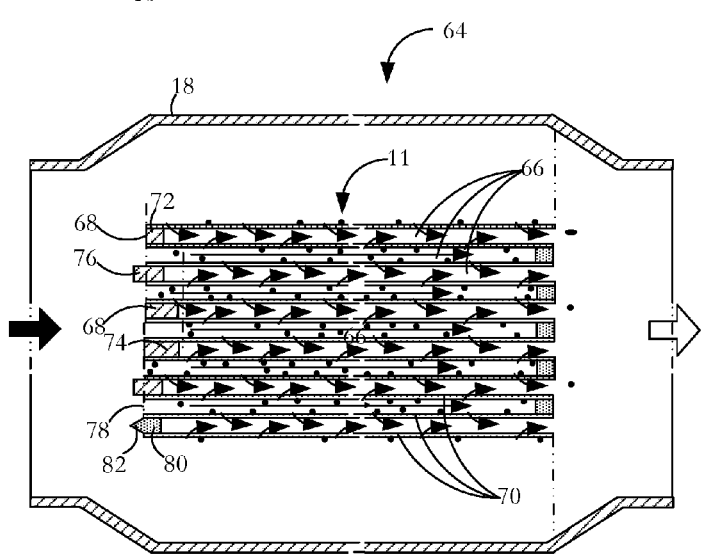
FIG. 19 is a longitudinal sectional representation showing a particulate filter gaseous emissions treatment unit according to an embodiment of the invention.

Referring to FIG. 19, in another embodiment of the invention, an exemplary induction heated particulate filter (PF) 64 is shown, the figure showing solely a part of the substrate body 11 and the outer casing 18. In comparison with a standard PF, some or all of cells 66 that are blocked at the input end of the substrate body 11 are blocked with metal wires 68 instead of the conventional ceramic plug. The metal wires 68 act to block the particular cells 66 so that the desired flow of exhaust gas through walls 70 of the substrate body 11 is achieved. In addition, the metal wires 68, when subject to a varying electromagnetic field, also function as local heaters. As shown in FIG. 19, metal wire plugs 68 in certain cells have lengths different from metal wire plugs in other cells. In one embodiment, metal wire plugs 72 near the outer part of the substrate body 11 are shorter than metal wire plugs 74 near the center of the unit to guide magnetic flux towards the core of the substrate body 11. The PF heating of the metal wire plugs 68 can be actuated during a fuel burn as a contributory part of heating during a regeneration cycle or can be used to preheat the PF so that, in both cases, less fuel need be injected during the fuel regeneration burn itself. If sufficient heat is generated by the induction heating, the use of extra fuel for the regeneration heating cycle may be obviated altogether.

In a fuel regeneration process, hot exhaust gases are generated some way upstream of the PF and may lose significant heat in the course of flowing to the PF from the engine. In contrast, the induction heating elements 68 are located within the substrate body 11 at its upstream side, so that the induction heat generated is immediately and directly used to heat the walls 70 of the PF with some of that heat being transferred along the length of the PF by a combination of radiation, convection and conduction.

As further illustrated in FIG. 19, all or some of the metal plugs at the input end of the PF unit can have surfaces that are flush with an input face of the unit as illustrated by metal plugs 68. Alternatively, some or all of the metal plugs can have end portions 76 protruding forwardly of the face 78 of the unit as shown by plugs. Inevitably, exhaust backpressure is generated at the PF unit because of the blocked cells. The back pressure causes a drop in engine performance and fuel economy. It is desirable to increase back pressure as little as possible commensurate with the PF unit effectively performing its exhaust emissions treatment. In use, when an exhaust stream 38 is direct through the exhaust pipe assembly against the input face 78 of the emissions treatment unit, the wire protruding heads 76 act to break up the pressure wave tending to build up at the face 78 of the substrate body where the exhaust impinges before flowing into the substrate body 11 and through its walls 70. The pressure wave front is caused to break up owing to the wave front encountering the wire protrusions 76 before encountering the input face 78 of the substrate body 11. Breakup of the wave front reduces the back pressure that the ceramic presents to the exhaust system which, in turn, increases exhaust gas velocity through the exhaust emissions unit.

Selection of the length of protrusion from the ceramic substrate front face 70 depends on several factors including cell density (cpsi) of the substrate body, wire array pattern, exhaust gas velocity and the wire diameter/cross-sectional area. In one embodiment of the invention the protrusion length is from one wire diameter upwards with a longer protrusion length corresponding to faster exhaust gas velocities. However, the protrusion length is not made so long that the broken up wave front will re-establish before the pressure wave impinges on the face of the input face of the ceramic substrate. Furthermore, the protrusion length is not made so long that there is a risk of the unsupported wire end bending at high temperature such as that experienced, for example, during a regeneration burn. Although illustrated for a PF in FIG. 19, metal inserts for catalytic converters can also be configured to protrude from the ceramic brick front surface for the same wave front breaking purpose. In addition, as further illustrated in the FIG. 19 PF, supplementing the effect of the protruding metal plugs, some or all of any ceramic plugs 88 at the leading end 78 of the unit can also be formed to have a wave front-breaking shape. The metal inserts for a catalytic converter or metal inserts or ceramic plugs for a PF can have protruding parts 76 with a curved or pointed profile as shown at 82 so as further to reduce back pressure.

One example embodiment of the invention had the following structural characteristics and performance:
- a cordierite honeycomb substrate body with 900 cpsi, 4.66 inches diameter and 3.75 inches length
- a 1:25 wire array pattern front-end loaded D-shaped profile
- total system weight (excluding case shielding, flux concentrator, etc.) of 523 grams made up of 454 grams of washcoated ceramic honeycomb with 67 grams of wire and 2 grams of mastic adhesive
- inductance with a 19 turn coil: 48 uH
- center temperature (1.5 inches from front face): 308° C. after 150 seconds at a frequency of 100 kHz for a 1.2 KW power draw Another example embodiment of the invention had the following structural characteristics and performance:
- a cordierite honeycomb substrate body with 400 cpsi, 5.66 inches diameter and 3.75 inches length
- a 1:25 wire array pattern full length symmetric profile
- total system weight (excluding case shielding, flux concentrator, etc.) of grams made up of 750 grams of washcoated ceramic honeycomb with 150 grams of wire and 5 grams of mastic adhesive
- inductance with a 15 turn coil: 64 uH
- center temperature (1.75 inches from front face): 140° C. after 150 seconds at a frequency of 87 kHz for a 1.2 KW power draw Other variations and modifications will be apparent to those skilled in the art and the embodiments of the invention described and illustrated are not intended to be limiting. The principles of the invention contemplate many alternatives having advantages and properties evident in the exemplary embodiments.

What is claimed is:

1. An assembly for treating gaseous emissions comprising a substrate body having a front end, a rear end, a plurality of cells for the passage of emissions gas, inductance heating metal located in the substrate body, and an induction heating coil mounted adjacent the substrate body for generating a varying electromagnetic field, thereby inductively to heat the metal and thereby to heat the substrate body, wherein a greater concentration of the metal is located near the front end of the substrate body than near the rear end of the substrate body;
   wherein the inductance heating metal is respective lengths of metal wire located in each of a first set of the plurality of cells; and
   wherein at least some of the lengths of metal wire are wire segments shorter than the full length of the substrate body.

2. The assembly of claim 1, wherein, the inductance heating metal is confined to a front part of the substrate body and the induction heating coil is mounted adjacent only a front part of the substrate body.

3. The assembly of claim 1, wherein end portions of the lengths of wire project from a front face of the substrate body at the front end.

4. The assembly of claim 3, wherein the induction heating coil extends beyond said front face so that a part thereof is mounted adjacent the projecting wire end portions.

5. The assembly of claim 3, wherein the projecting wire end portions taper towards the ends of the wires.

6. The assembly of claim 3, wherein at least two of the projecting wire end portions are joined to each other by a spiral heating element wherein the element is mounted in front of the front face for inductive heating thereof by the induction coil.

7. The assembly as claimed in claim 3, wherein wire segments are located at the front of the substrate body but not at the back of the substrate body, the induction heating coil mounted adjacent the substrate body at the front of the assembly.

8. The assembly as claimed in claim 3, wherein wire segments in a first subset of the first set of cells are longer than wire segments in a second subset of the first set of cells.

9. The assembly, of claim 1, there being a greater concentration of wire per unit volume of the substrate body towards the center of the substrate body than at the perimeter thereof.

10. The assembly as claimed in claim 1, the metallic composition of one wire being different from the metallic composition of at least one other wire.

11. The assembly as claimed in claim 1, the substrate body made of a ceramic honeycomb material.

12. The assembly as claimed in claim 1, the metal being a ferromagnetic metal.

13. The assembly as claimed in claim 1, the wires having one of a hollow and an open cross-section configuration.

14. A process for treating gaseous emissions using an assembly having an induction coil mounted adjacent a substrate body, the substrate body having a plurality of cells for the passages of emissions gas, inductance heating metal located in the substrate body with a greater concentration of the inductance heating metal being located near a front end of the substrate body than near a rear end of the substrate body, wherein the inductance heating metal is respective lengths of metal wire located in each of a first set of the plurality of cells and wherein at least some of the lengths of metal wire are wire segments shorter than the full length of the substrate body and an induction heating coil mounted adjacent the substrate body, the method comprising passing gaseous emissions along the cells, generating a varying electromagnetic field at the coil thereby to cause induction heating of the metal, heat from the heating heated metal being transferred to the substrate body and to the gaseous emissions passing along the cells, the heating being greater at the front end of the substrate body than at the rear end thereof.

15. The process as claimed in claim 14, walls of the cells having a catalyst surface layer, the induction heating acting to heat the layer to promote a catalytic reaction in the gaseous emissions passing along the cells.

16. The process as claimed in claim 15, the catalytic reaction being an exothermic reaction.

17. The process as claimed in claim 14, further comprising generating the varying electromagnetic field when an engine which is the source of the emission gases is operating and when the substrate body is below a predetermined threshold temperature.

18. The process as claimed in claim 14, further comprising generating the varying electromagnetic field for an engine which is to be the source of the emission gases before start-up of the engine.

19. The process as claimed in claim 14, further comprising inductively preheating gaseous emissions before the gaseous emissions enter the substrate body.

* * * * *